(12) United States Patent
Ram et al.

(10) Patent No.: US 6,195,722 B1
(45) Date of Patent: Feb. 27, 2001

(54) METHOD AND APPARATUS FOR DEFERRING TRANSACTIONS ON A HOST BUS HAVING A THIRD PARTY AGENT

(75) Inventors: Rajee Ram, Beaverton; Lily Pao Looi, Portland; Suresh S. Chittor, Beaverton; David R. Jackson, Hillsboro, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/013,776

(22) Filed: Jan. 26, 1998

(51) Int. Cl.$^7$ ...................................................... G06F 13/38
(52) U.S. Cl. ............................................................ 710/129
(58) Field of Search ..................................... 710/100, 107, 710/126, 128, 129; 711/124, 3

(56) References Cited

U.S. PATENT DOCUMENTS

| | | | |
|---|---|---|---|
| 4,682,284 | * 7/1987 | Schrofer | 710/55 |
| 5,121,480 | * 6/1992 | Bonke et al. | 711/3 |
| 5,535,340 | * 7/1996 | Bell et al. | 710/107 |
| 5,603,005 | * 2/1997 | Bauman et al. | 711/124 |
| 5,615,343 | * 3/1997 | Sarangdhar et al. | 710/102 |
| 5,649,157 | * 7/1997 | Williams | 711/151 |
| 5,649,225 | * 7/1997 | White et al. | 712/23 |
| 5,680,576 | * 10/1997 | Laudon | 711/145 |
| 6,012,118 | * 1/2000 | Jayakumar et al. | 710/126 |

* cited by examiner

Primary Examiner—Glenn A. Auve
(74) Attorney, Agent, or Firm—Kenyon & Kenyon

(57) ABSTRACT

A method and apparatus for third party agent transaction deferral on a host bus. A host bus transaction request is received from a device, and transaction information related to the transaction request is stored in an out of order queue. An indication is received from the third party agent that the transaction has been deferred, and the stored transaction information is updated to reflect that the transaction has been deferred.

19 Claims, 5 Drawing Sheets

METHOD AND APPARATUS FOR DEFERRING TRANSACTIONS ON A HOST BUS HAVING A THIRD PARTY AGENT

FIELD OF THE INVENTION

The invention relates to the transfer of information on a host bus. More particularly, the invention relates to a method and apparatus for third party agent transaction deferral on a host bus.

BACKGROUND OF THE INVENTION

In a typical computer system, such as a personal computer, a processor can communicate with peripherals, such as a memory subsystem, a graphics subsystem or another processor in the computer system, over an information path referred to as a "host" bus. The host bus carries "transactions," such as requests to read or write information, between devices that communicate on the host bus. One or more processors in the computer system are generally attached directly to the host bus.

In addition to one or more processors, a group of integrated circuits, called a "chip set," can be attached directly to the host bus. The chip set also communicates with peripherals, such as a graphics subsystem, attached to a "local" bus and a memory subsystem. A bus that complies with a Peripheral Component Interconnect (PCI) standard (e.g., PCI Local Bus Specification, Version 2.1, a copy of which can be obtained from the PCI Special Interest Group in Portland, Oreg.) is an example of such a local bus. If a peripheral attached to the PCI bus wishes to send a transaction to a processor, the transaction is sent from the peripheral to the chip set over the PCI bus. The chip set then forwards the transaction to the appropriate processor over the host bus.

The processors and the chip set are commonly referred to as "agents" on the host bus. In addition to one or more processors and the chip set, a Third-Party Agent (TPA) can also be connected to the host bus. An optional cluster bridge that connects a first computer system to a second computer system, generally by communicating with another cluster bridge on the second computer system's host bus, is an example of such a TPA. This arrangement has the advantage of increasing the number of processors that can work together. For example, if the host bus can only support four processors, a cluster bridge TPA allows the first computer system to communicate with other processors in the second computer system, letting more than four processors work together. In this case, peripherals on the PCI bus of the first computer system can direct transactions to, for example, a processor in the second computer system through the TPA.

Transactions from the PCI bus are typically performed in the order they are received by the chip set. Assume, for example, that the chip set receives a first transaction requesting to write information to the TPA from the PCI bus. Next, the chip set receives a second transaction requesting to send data to the memory subsystem from the PCI bus. In this case, the first transaction would normally be completed before the second transaction is acted upon. Note that the two transactions could originate from the same peripheral or from different peripherals on the PCI bus.

This "in order" execution scheme, however, can cause a problem when the first transaction cannot be completed in a timely manner. Suppose, in the above example, that the TPA is not able to immediately complete the first transaction, perhaps because the TPA is temporarily busy communicating with a second computer system. If the second transaction is simply held up until the first transaction is completed, in effect all of the devices attached to the host bus are waiting for the TPA, even though those devices do not need to use the TPA. This obviously has a negative impact on the performance of the host bus and on the computer system as a whole.

To avoid this problem, it is known to have the TPA indicate that a particular transaction should be "retried" at a later point in time. The transaction is retried at a later point in time by being resent to the TPA over the host bus. This allows the other devices on the host bus to continue to work when the TPA is busy, improving system performance. The retry method is called an "out of order" execution scheme because in effect the transactions are not being performed in the order that they were originally requested—the agent on the host bus that originally issued the transaction request is forced to re-issue the request at a later time.

The retry solution, however, also has a disadvantage. It is possible that a device, such as a peripheral on the PCI bus, will retry a transaction immediately after the TPA indicates that it is unable to perform that transaction. In this case, depending on the length of time that the TPA is busy, the host bus could become flooded with retry requests for the same transaction. This also would have a negative impact on system performance, because unnecessary transactions on the host bus prevent the agents from communicating with each other.

With respect to processors on the host bus, this problem has been addressed by using a different out of order execution scheme. In this case, the processor "defers" a transaction request, as opposed to having the request retried. When a transaction is deferred, the processor will eventually perform the transaction without the agent re-sending the command on the host bus. When the processor later performs the transaction, it informs the agent that generated the original transaction request by sending a "defer reply" over the host bus. Previously, there has been no similar way for a TPA to defer a transaction on the host bus. Moreover, a transaction deferral scheme cannot simply be added to existing TPA and chip set logic because, for example, the chip set would have no way of tracking and identifing the out of order deferred transactions and their associated defer replies.

In view of the foregoing, it can be appreciated that a substantial need exists for a method and apparatus that reduces unnecessary transactions and delays involving a TPA on a host bus, and solving the other problems discussed above.

SUMMARY OF THE INVENTION

In accordance with an embodiment of the present invention, a transaction request is received from a device, and transaction information related to the transaction request is stored. An indication is received from a third party agent that the transaction has been deferred, and the stored transaction information is updated to reflect that the transaction has been deferred.

DETAILED DESCRIPTION

Figure 1:
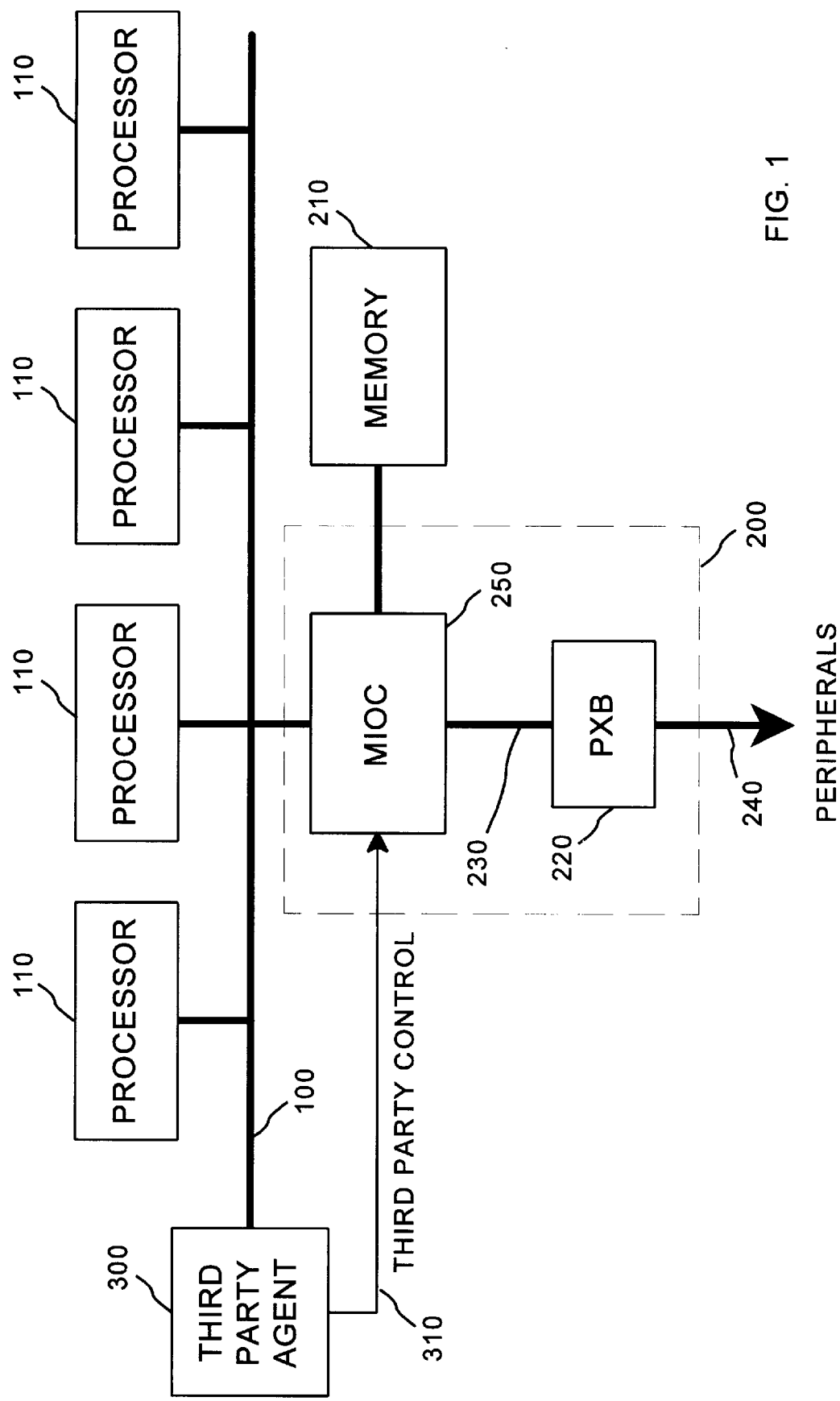
FIG. 1 is a block diagram of a computer system according to an embodiment of the present invention.

The present invention is directed to a method and apparatus for TPA transaction deferral on a host bus. Referring now in detail to the drawings wherein like parts are designated by like reference numerals throughout, there is illustrated in FIG. 1 a block diagram of a computer system according to an embodiment of the present invention. The computer system includes a chip set 200 that communicates with a number of processors 110 over a host bus 100. The host bus 100 can be, for example, a 100 MHz extended Gunning Transceiver Logic (GTL+) bus. The processors 110 can be any processors of sufficient processing power to function with embodiments of the present invention. For example, the INTEL family of processors, including the Pentium® II, or similar processors, are suitable to practice the invention. Although four such processors 110 are shown in FIG. 1, the present invention can be used with any number of processors, including a single processor.

The chip set 200 communicates over the host bus 100 through a Memory and Input/Output Controller (MIOC) 250. The chip set 200 also communicates with peripherals connected to a PCI bus 240 through a PCI Expander Bridge (PXB) 220. The MIOC 250 and the PXB 220 communicate over an expander bus 230, such as a fast 16 bit wide bus. The chip set 200 thus provides an integrated Input/Output (I/O) bridge, memory controller and a flexible I/O subsystem core optimized for multi-processor systems and standard high-volume (SHV) servers.

The PCI bus 240 can be, for example, a 32 bit 33 MHz bus connecting the computer system to peripherals, such as a network card or a graphics adaptor (not shown in FIG. 1). Although only a single PXB 220 is shown in FIG. 1, the present invention can also be used with several PXBs. Similarly, although only a single PCI bus 240 is associated with the PXB 200 shown in FIG. 1, the PXB 220 could instead provide an interface for two independent PCI buses. The PXB 220 could be a master and target on both buses, which would be processed independently except when transactions must be forwarded across the expander bus 230 between the PXB 220 and the MIOC 250.

The PXB 220 receives transaction requests from peripherals, such as a request to send information to a processor 110, over the PCI bus 240. Such requests, referred to herein as "inbound" requests, are reformatted by the PXB 220 and sent to the MIOC 250 over the expander bus 230.

The MIOC 250 also provides the data port and buffering for data transferred between the host bus 100, PXB 220 and a memory subsystem 210. The memory subsystem 210 can be, for example, Dynamic Random Access Memory (DRAM) accessed using a data path multiplexor and a Row Address Strobe/Column Address Strobe (RAS/CAS) Generator (not shown in FIG. 1). The MIOC 250 accepts data from the host bus 100 to be routed to either the memory 210 subsystem or to the PCI bus 240. It accepts data from the memory subsystem 210 to be routed to either the host bus 100 or the PCI bus 240, and data from the PXB 220 to be routed to either the host bus 100 or the memory subsystem 210. The MIOC 250 does this by monitoring the host bus 100 and examining the address of each request. Access may be directed to a memory request queue, for subsequent forwarding to the memory subsystem 210, or to an outbound request queue, for subsequent forwarding to the PXB 220 and hence to the PCI bus 240. The MIOC 250 supports all request types, including partial reads, partial writes and, as explained in detail below, deferred transactions.

In addition to the processors 110 and the MIOC 250, the host bus 100 allows for additional non-processor-bus masters, generically referred to herein as Third-Party Agents (TPAs) 300. The TPA 300 may be a "symmetric" agent, in which case it participates in the host bus 100 arbitration algorithm used by the processors 110. The TPA 300 may also be a "priority" agent, in which case it must negotiate with the MIOC 250 for control of the host bus 100. An optional cluster bridge connecting to another node, and thus allowing for scalability, is an example of such a TPA 300. The MIOC 250 supports processor-TPA memory-mapped accesses, TPA-memory accesses, TPA-PCI and I/O access and PCI-TPA memory accesses. According to an embodiment of the present invention, accesses to the TPA may be retried or deferred.

The chip set 200 also supports Third-Party Control side-band signals 310, which let the TPA 300 intercede and change the normal response of transactions between the processors 110 and the chip set 200. The TPA 300 may instruct the MIOC 250 to accept the request, retry the request or defer the request. The TPA 300 could also be allowed to instruct the MIOC 250 to fail the request, if desired. In the defer case, the MIOC 250 will issue a defer response, but the TPA 300 then has responsibility for completing the transaction at a later time, and informing the MIOC 250 that the transaction has been completed by sending a defer reply over the host bus 100. For a deferred read, the TPA 300 must return the data to the requesting agent. For a deferred write, the TPA 300 must accept the data placed on the host bus 100, and ensure that it eventually reaches memory.

Figure 2:
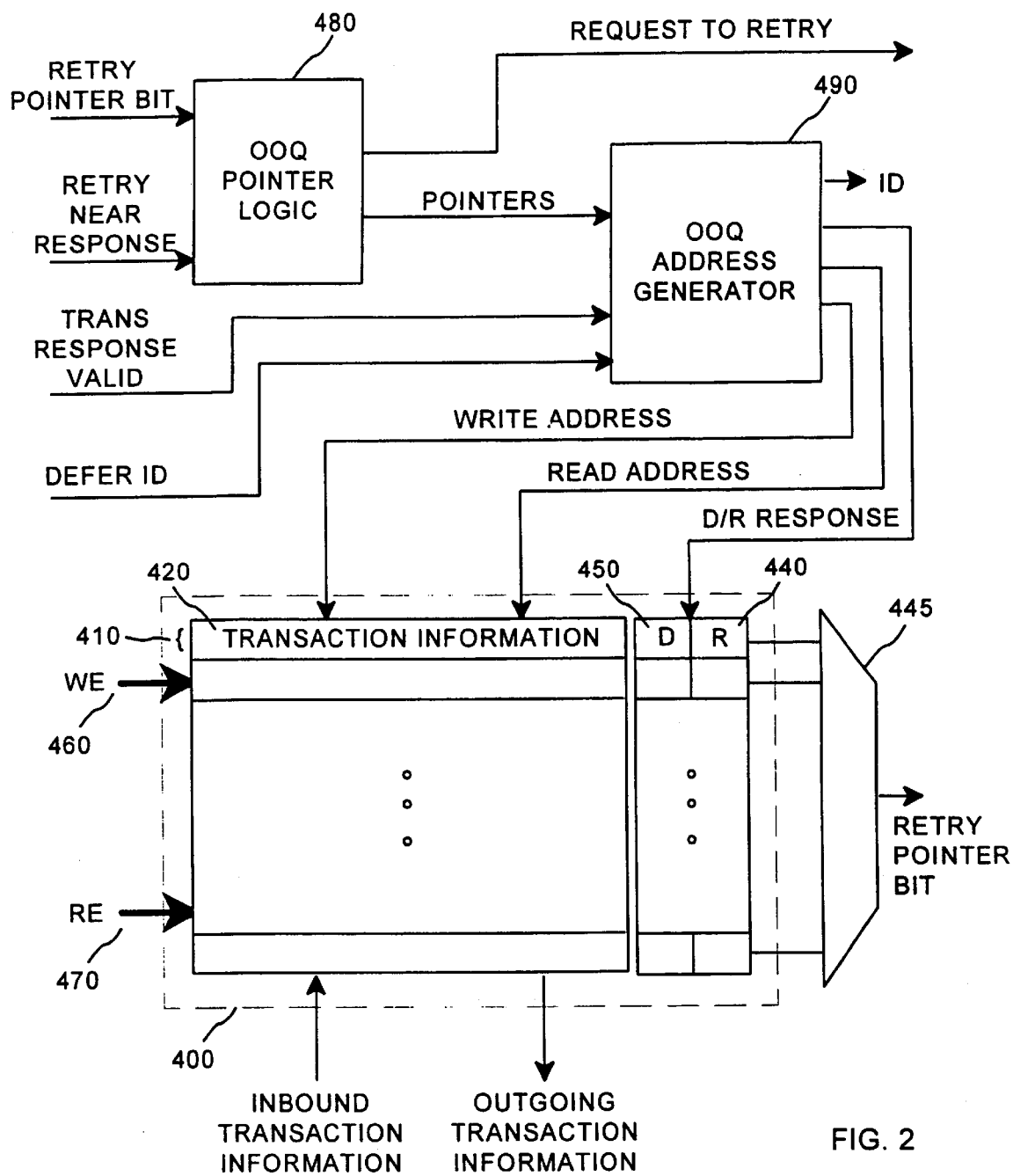
FIG. 2 is a block diagram of an out of order queue and controller for managing deferred transactions from a TPA according to an embodiment of the invention.

According to an embodiment of the present invention, the MIOC 250 manages such deferred transactions from the TPA 300 using an Out of Order Queue (OOQ) 400, shown in FIG. 2. The OOQ 400 is a list of inbound transaction information that can be accessed in random access mode. Note that only inbound transactions are stored in the OOQ 400. In an embodiment of the present invention, the OOQ 400 is 16 positions deep and 88 bits wide, and the queue information is stored in Random Access Memory (RAM). Each entry 410 in the OOQ 400 includes transaction information 420, such as a transaction type indicating, for example, a memory read or write, an address and data. Entries 410 in the OOQ 400 can go "out of order," for example, when the TPA 300 defers an inbound transaction on the host bus 100.

Every inbound transaction is stored in the OOQ 400 along with a retry status bit 440 and a defer status bit 450. The retry and defer status bits 440, 450 are stored using flip flops. When an inbound transaction is put on the host bus 100 it is simultaneously latched into the OOQ 400 and the retry and defer status bits 440, 450 are not set If the reply is normal, that is the transaction has been immediately completed, the associated transaction information 410 is removed from OOQ 400. This frees up that position in the OOQ 400 for another transaction.

If, however, the TPA 300 instead indicates that the transaction must be retried, the retry status bit 440 associated with the transaction is set. Similarly, if the TPA 300 indicates that the transaction has been deferred, the defer status bit 450 is set. In each of these cases, the transaction information is not removed from the OOQ 400. A transaction with a "retry" response is retried at an appropriate time. A transaction with a "defer" response is stored in the queue until the defer reply is issued, at which point it is removed from the queue. If an entry is removed from the queue because a defer reply is received, the entry will also be latched back into the queue at the next available location so that it can be retried. Thus, in addition to issuing a defer reply, the TPA 300 can even retry its own defer reply. This could happen if the TPA 300 will have data available at a later time.

As is also shown in FIG. 2, latching transactions into the OOQ 400 and gating them off the OOQ 400 are controlled by queue pointer logic made up of combinational logic and state machines. The transfer of inbound and outgoing transaction information for the OOQ 400 is achieved using a write enable signal 460 and a read enable signal 470, along with associated write and read addresses controlled by an OOQ address generator 490. This is done using queue pointers, as required, maintained by OOQ pointer logic 480: a current transaction pointer; a retry pointer; and a response pointer. In summary, the current transaction pointer indicates the empty position in the OOQ 400 where an incoming transaction will be stored; the retry pointer indicates the entry in the queue which will be retried next; and the response pointer indicates the entry awaiting response. The pointers, and their associated control logic, will now be explained in detail.

The current transaction pointer indicates the position in the OOQ 400 where the information for the next transaction will be stored. The control of the current transaction pointer is described in detail with respect to FIG. 4.

The OOQ 400 generates retry requests for transactions that need to be retried, and the retry pointer indicates which transaction in the OOQ 400 will be retried next. In other words, it points to a transaction in the OOQ 400 that will be resent over the host bus 100. The retry pointer cycles through each position in the OOQ 400 that has the retry bit 440 set, in order. The OOQ pointer logic 480 sends a request to retry signal to a request generator unit (not shown in FIG. 2) in the MIOC 250. Each time a transaction in the OOQ 400 is resent, the retry pointer moves down to the next position with a retry bit 440 set, moving to the top of the OOQ 400 when all of the retry transactions have been resent. The OOQ pointer logic 480 also uses a retry pointer bit signal generated by a mux device 445 and retry near response signal to monitor when the retry pointer is catching up to the response pointer. If so, the retry pointer can be prevented from advancing further.

The response pointer indicates which transaction in the OOQ 400 gets a response from the host bus 100. When the current transaction pointer gets updated, it is pushed into a 16 deep First-In First-Out (FIFO) queue. The top of this FIFO is the response pointer.

The OOQ address generator 490 also supplies a transaction identification (ID) number to all transactions for which the chip set 200 is the master. The transaction ID is generated based on the transaction's position in the OOQ 400, so all inbound transactions are temporarily latched into the queue to get a transaction ID. For example, if the OOQ 400 is 16 positions deep, transaction IDs of 0 to 15 could be assigned to all transactions. Even though a multi-line transaction is not retried when retry pointer moves, it is still stored in OOQ 400 so it can be assigned a consistent transaction ID. A defer reply from the TPA 300 will include a defer ID identical to the transaction ID of the original transaction request. The defer reply is matched with the appropriate entry in the OOQ 400 using the defer ID, which will equal the position of the related transaction information in the OOQ 400.

The OOQ can also keep track of the number of transactions stored in the queue so that when a predetermined count is reached new transactions can be blocked from being issued on the host bus 100 by the chip set 200. In addition, it may take a little time to find empty slots when the TPA 300 is retrying and deferring a lot of transactions. In this case, the OOQ 400 can drive a signal to temporarily block inbound requests from being issued on the host bus 100.

Figure 3A:
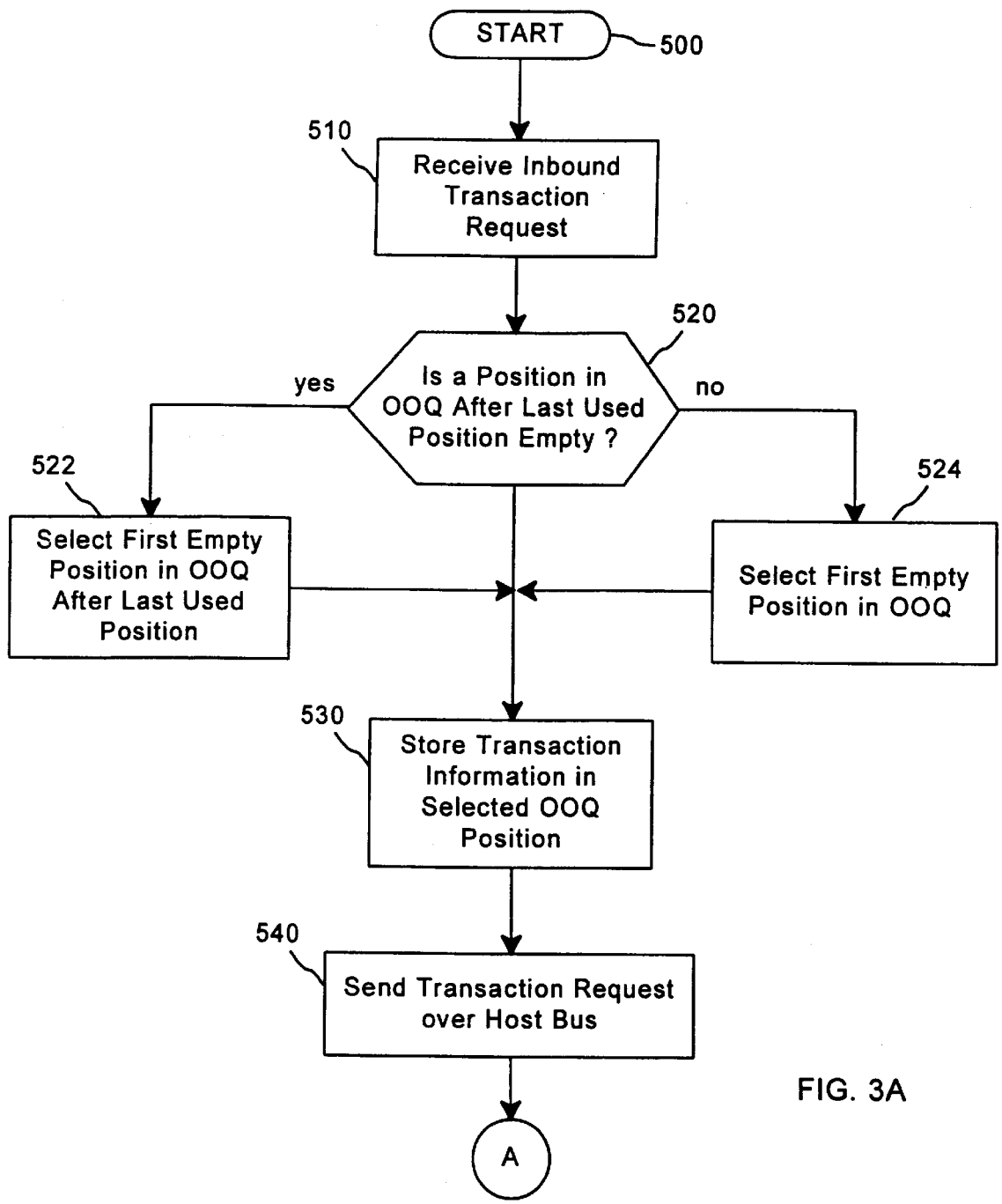
FIGS. 3A and 3B are block flow diagrams of steps performed according to an embodiment of the invention.

A method of managing such deferred transactions according to an embodiment of the present invention will now be described with respect to FIGS. 3A and 3B. As shown in FIG. 3A, after beginning at step 550 an inbound transaction request is received at step 510.

If there is an empty position in the OOQ 400 after the last used position, the first empty position in the OOQ 400 after the last used position is selected in steps 520 and 522. If there is not an empty position in the OOQ 400 after the last used position, the first empty position in the OOQ 400 is selected instead. This process is described in greater detail with respect to FIG. 4.

Transaction information related to the inbound transaction request is then stored in the selected OOQ 400 position in step 530 and the transaction request is sent over the host bus 100 at step 540.

Figure 3B:
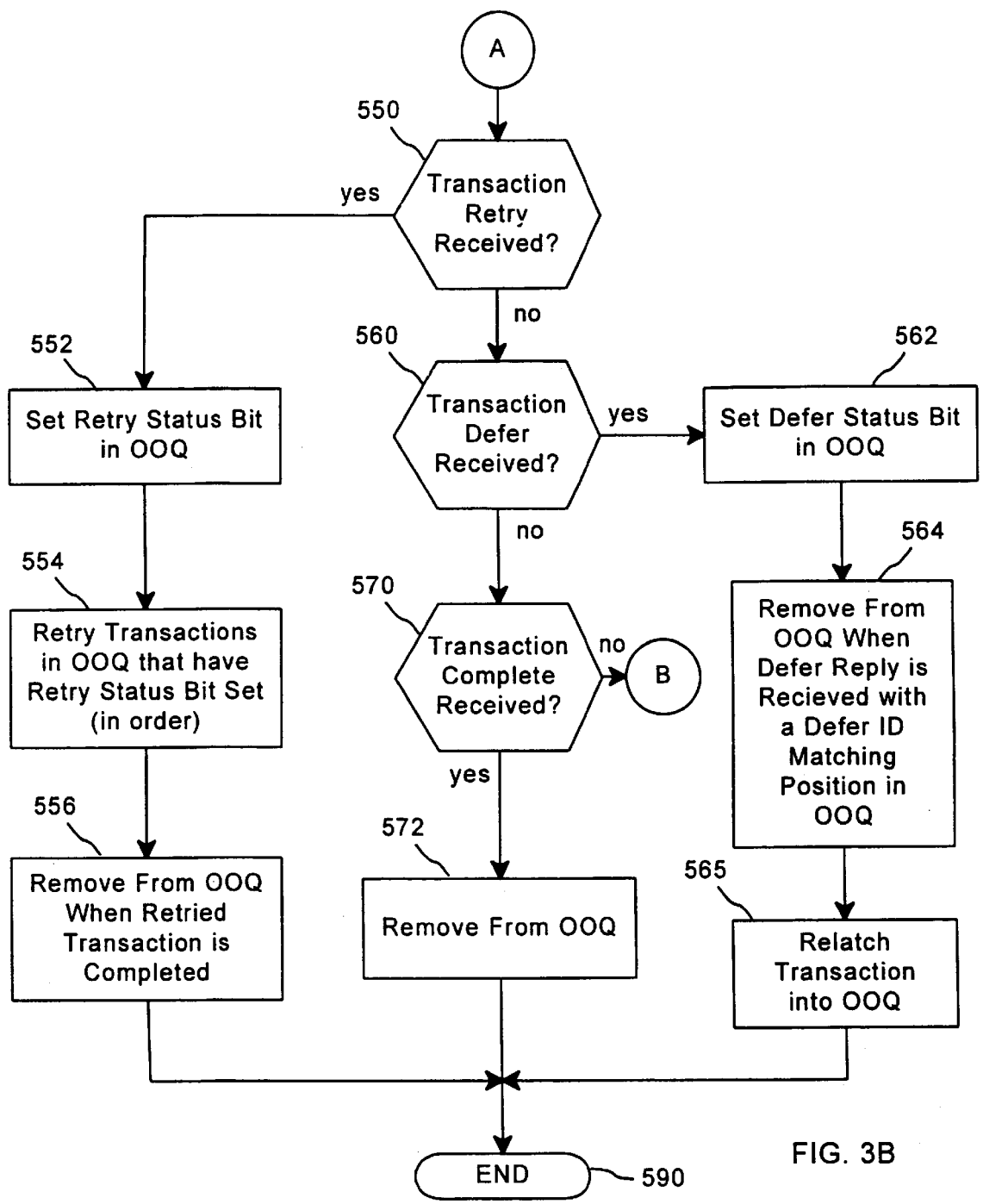

The process continues, as shown in FIG. 3B, and if a transaction retry is received at step 550 the retry status bit in the OOQ 400 is set at step 552. All transactions in the OOQ 400 that have their associated retry status bit set will then be retried, in the order the appear in the OOQ 400, at step 554. When the retried transaction is completed, the transaction information is removed from the OOQ 400 at step 556 and the process ends at step 590.

If a transaction defer, as opposed to a transaction retry, is received instead at step 560, the defer status bit in the OOQ 400 is set at step 562. When a defer reply is received with a defer identification matching the transactions position in the OOQ 400, the transaction information is removed from the OOQ 400 in step 564 and the process ends at step 590. In this case, after the transaction is removed, it is also re-latched into the next available position in the OOQ 400 at step 565 as if it were a new transaction. This lets the TPA 300 retry its own defer reply, such as when it will have data available at a later time.

If a transaction complete was received at step 570, the transaction is simply removed from the OOQ 400 at step 572 and the process ends at step 590. If the transaction is not retried, deferred or completed, such as when a transaction has failed, some other logic (indicated by the letter B in FIG. 3B) would have to be performed. Such logic could include removing the failed transaction from the OOQ 400, if desired.

Figure 4:
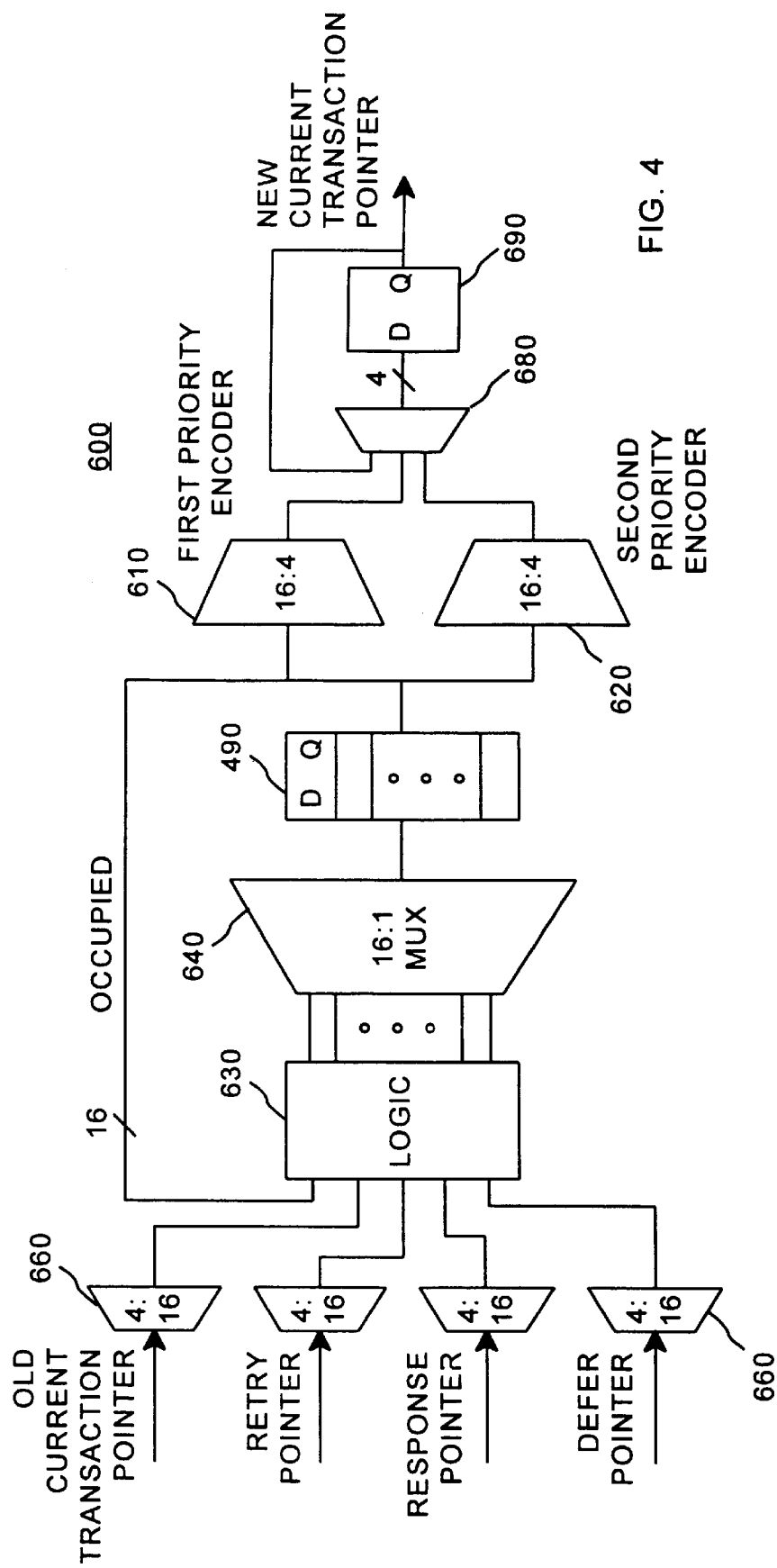
FIG. 4 is block diagram of a current transaction pointer controller according to an embodiment of the invention.

FIG. 4 is block diagram of a current transaction pointer controller 600 in accordance with an embodiment of the invention. Assume that the OOQ 400 has 16 positions and that positions 3, 10 and 12 are empty. That is, all of the other positions in the OOQ 400 contain information related to "outstanding" transactions on the host bus.

The current transaction pointer controller 600 shown in FIG. 4 selects the next empty position in the OOQ 400 for an incoming transaction. The purpose of the current transaction pointer controller 600 is to generate a "new" current transaction pointer based on the "old" current transaction pointer and the state of the OOQ 400. In general, the first empty position in the OOQ 400 after the old current transaction pointer should be selected as the new current transaction pointer. If there is no empty position after the old current transaction pointer, the first empty position in the OOQ 400 should be selected—that is, the current transaction pointer should "wrap" to the top of the OOQ 400.

Because an embodiment of the present invention uses an OOQ 400 having 16 positions, each OOQ pointer, including the current transaction pointer, is represented by four bits representing the numbers 0 to 15 in binary. The old current transaction pointer and the other OOQ pointers each pass through a 4:16 mux device 660 and pointer control logic 630. After passing through a 16:1 mux device 640, the output of the pointer control logic 630 is latched in a group of sixteen flip flops 490. Each flip flop in the group 490 indicates if a position in the OOQ 400 is occupied, i.e. contains transaction information, or if it is empty.

The goal of the current transaction pointer controller 600 is to generate a new current transaction pointer, and two round robin priority encoders 610, 620 are used for this purpose. The OOQ 400 is primarily spilt into two halves: from the current location to the end of the queue; and from the beginning of the queue to the current location, inclusive. The first priority encoder 610 finds the first available free location between the current location and the end of the queue by masking the flip flops in the group 490 representing all locations above the current location as un-selectable. The second priority encoder 620 selects the next available location from the beginning of the queue to the current location, inclusive. The location selected by the second priority encoder 620 will be used if, and only if, there is none selected by the first priority encoder 610. The result of this determination is held as the new current transaction pointer using mux device 680 and flip flop 690.

Although various embodiments are specifically illustrated and described herein, it will be appreciated that modifications and variations of the present invention are covered by the above teachings and within the purview of the appended claims without departing from the spirit and intended scope of the invention. For example, although a queue having 16 entries and specific queue pointers was used to illustrate an embodiment of the present invention, it will be appreciated that other queue structures could also fall within the scope of the invention. Moreover, although hardware is described to control, for example, the current transaction pointer, such functions could also be performed using software, or a combination of hardware and software, as is well known in the art.

What is claimed is:

1. A method for managing transactions on a host bus having a third party agent, comprising the steps of:
   receiving a first transaction request from a device;
   storing first transaction information related to the first transaction request;
   receiving an indication from the third party agent that the first transaction has been deferred;
   updating the stored first transaction information to reflect that the first transaction has been deferred;
   receiving a second transaction request;
   storing second transaction information related to the second transaction request;
   receiving an indication from the third party agent that the second transaction must be retried; and
   updating the stored transaction information to reflect that the second transaction must be retried.

2. The method of claim 1 wherein said storing first transaction information comprises storing the first transaction information in an out of order queue and said updating the stored first transaction information comprises updating the transaction information stored in the out of order queue to reflect that the first transaction has been deferred.

3. The method of claim 2 further comprising the steps of:
   receiving an indication from the third party agent that the first transaction has been completed; and
   removing the first transaction information from the out of order queue.

4. The method of claim 3, wherein the indication received from the third party agent includes a deferred transaction identifier corresponding to the position of the first transaction information in the out of order queue.

5. The method of claim 2 wherein the out of order queue has a number of positions, including empty positions that do not contain transaction information, and said storing first transaction information comprises:
   selecting the next empty position in the queue after the last used position if there is an empty position in the queue after the last used position;
   selecting the first empty position in the queue if there is not an empty position in the queue after the last used position; and
   storing the first transaction information in the selected position.

6. The method of claim 2 wherein the position of the first transaction information in the out of order queue is used to assign a transaction identifier to the first requested transaction.

7. The method of claim 1, wherein the stored second transaction information is used to reissue the second transaction on the host bus.

8. An apparatus to manage transactions on a host bus having a third party agent, comprising:
   a memory unit configured to store an out of order queue, to receive a transaction request to be issued on the host bus, and to receive a response issued by the third party agent on the host bus;
   a queue controller coupled to said memory unit, wherein said queue controller and said memory unit are configured to store transaction information related to the transaction request, including whether the transaction has been deferred by the third party agent, in the out of order queue, and wherein said queue controller comprises:
      a pointer controller configured to maintain out of order queue pointers; and
      an address generator coupled to said pointer controller and to said memory unit, wherein said pointer controller, said address generator and said memory unit are further configured to store transaction information related to the transaction request, including whether the transaction has been deferred by the third party agent, in the out of order queue; and
   wherein said pointer controller, said address generator and said memory unit are further configured to store in the out of order queue whether the third party agent has indicated that the transaction must be retried.

9. The apparatus of claim 8, wherein said memory unit includes random access memory to store transaction information.

10. The apparatus of claim 8, wherein said pointer controller, said address generator and said memory unit are further configured to remove the transaction information from the out of order queue when the third party agent indicates that the transaction has been completed.

11. The apparatus of claim 10, wherein said pointer controller, said address generator and said memory unit are configured to remove the transaction information from the out of order queue based on a defer identifier received from the third party agent, the defer identifier corresponding to the position of the transaction information stored in the out of order queue.

12. The apparatus of claim 8, wherein the out of order queue pointers include a retry pointer used to access transaction information for transactions that the third party agent has indicated must be retried.

13. The apparatus of claim 8, wherein the out of order queue pointers maintained by said pointer controller include a current transaction pointer.

14. The apparatus of claim 13, wherein said pointer controller updates the current transaction pointer to indicate the next empty position in the queue after the last used position if there is an empty position in the queue after the last used position, or the first empty position in the queue if there is not an empty position in the queue after the last used position.

15. The apparatus of claim 8, wherein said address generator also generates a transaction identifier for transactions on the host bus based on the position of the transaction information stored in the out of order queue.

16. A method for managing transactions on a host bus having a third party agent, comprising:
  receiving a transaction request from a device;
  storing in an out of order queue transaction information related to the transaction request;
  receiving an indication from the third party agent that the transaction has been deferred;
  updating the transaction information stored in the out of order queue to reflect that the transaction has been deferred;
  receiving a second transaction request;
  storing second transaction information related to the second transaction request in the out of order queue;
  receiving an indication from the third party agent that the second transaction must be retried; and
  updating the transaction information stored in the out of order queue to reflect that the second transaction must be retried.

17. A method for managing transactions on a host bus having a third party agent, comprising:
  receiving a transaction request from a device;
  storing in an out of order queue transaction information related to the transaction request;
  receiving an indication from the third party agent that the transaction has been deferred;
  updating the transaction information stored in the out of order queue to reflect that the transaction has been deferred;
  wherein the out of order queue has a number of positions, including empty positions that do not contain transaction information, and said storing transaction information comprises:
    selecting the next empty position in the queue after the last used position if there is an empty position in the queue after the last used position;
    selecting the first empty position in the queue if there is not an empty position in the queue after the last used position; and
    storing the transaction information in the selected position; and
  wherein further transactions to the host bus are prevented unless there are predetermined number of empty positions in the out of order queue.

18. An apparatus to manage transactions on a host bus having a third party agent, comprising:
  a memory unit configured to store an out of order queue, to receive a transaction request to be issued on the host bus, and to receive a response issued by the third party agent on the host bus;
  a queue controller coupled to said memory unit, wherein said queue controller and said memory unit are configured to store in the out of order queue transaction information related to the transaction request, including whether the transaction has been deferred by the third party agent, and wherein said queue controller comprises:
    a pointer controller configured to maintain out of order queue pointers; and
    an address generator coupled to said pointer controller and to said memory unit, wherein said pointer controller, said address generator and said memory unit are further configured to store transaction information related to the transaction request, including whether the transaction has been deferred by the third party agent, in the out of order queue;
  wherein said memory unit includes random access memory to store transaction information; and
  wherein said memory unit includes flip flops for storing whether the transaction has been deferred or must be retried.

19. An apparatus to manage transactions on a host bus having a third party agent, comprising:
  a memory unit configured to store an out of order queue, to receive a transaction request to be issued on the host bus, and to receive a response issued by the third party agent on the host bus;
  a queue controller coupled to said memory unit, wherein said queue controller and said memory unit are configured to store in the out of order queue transaction information related to the transaction request, including whether the transaction has been deferred by the third party agent, and wherein said queue controller comprises:
    a pointer controller configured to maintain out of order queue pointers; and
    an address generator coupled to said pointer controller and to said memory unit, wherein said pointer controller, said address generator and said memory unit are further configured to store transaction information related to the transaction request, including whether the transaction has been deferred by the third party agent, in the out of order queue;
  wherein said pointer controller, said address generator and said memory unit are further configured to store in the out of order queue whether the third party agent has indicated that the transaction must be retried;
  wherein the out of order queue pointers include a retry pointer used to access transaction information for transactions that the third party agent has indicated must be retried; and
  wherein the out of order queue pointers further include a response pointer indicating which transaction stored in the out of order queue gets a response from the host bus.

* * * * *

UNITED STATES PATENT AND TRADEMARK OFFICE
CERTIFICATE OF CORRECTION

PATENT NO. : 6,195,722 B1
DATED : February 27, 2001
INVENTOR(S) : Ram et al.

It is certified that error appears in the above-identified patent and that said Letters Patent is hereby corrected as shown below:

Column 2,
Line 42, delete "identifing" and replace with -- identifying --;

Column 4,
Line 55, delete "set If" and replace with -- set. If --;

Column 7,
Line 18, delete "spilt" and replace with -- split --.

Signed and Sealed this

Fifth Day of March, 2002

*Attest:*

*Attesting Officer*

JAMES E. ROGAN
*Director of the United States Patent and Trademark Office*